(12) United States Patent
Pabst

(10) Patent No.: US 7,374,217 B2
(45) Date of Patent: *May 20, 2008

(54) TWO WAY NON LEAKING FLOW VALVE WITH FULL-OPEN CAPABILITY

(75) Inventor: William V. Pabst, Murfreesboro, TN (US)

(73) Assignee: Parker-Hannifin Corporation, Cleveland, OH (US)

(*) Notice: Subject to any disclaimer, the term of this patent is extended or adjusted under 35 U.S.C. 154(b) by 777 days.

This patent is subject to a terminal disclaimer.

(21) Appl. No.: 10/267,168

(22) Filed: Oct. 9, 2002

(65) Prior Publication Data

US 2003/0062735 A1 Apr. 3, 2003

Related U.S. Application Data

(63) Continuation-in-part of application No. 09/966,862, filed on Sep. 28, 2001, now Pat. No. 6,517,050.

(51) Int. Cl.
*B25J 15/06* (2006.01)
*F16K 31/383* (2006.01)

(52) U.S. Cl. .................. 294/64.1; 251/339

(58) Field of Classification Search ...... 294/64.1–64.3, 294/65; 251/339, 341
See application file for complete search history.

(56) References Cited

U.S. PATENT DOCUMENTS

| | | | | |
|---|---|---|---|---|
| 636,465 A | * | 11/1899 | Sowle et al. ............... 251/294 |
| 1,294,103 A | * | 2/1919 | Hitchcock ................ 294/64.1 |
| 2,607,620 A | * | 8/1952 | Oliveri .................... 294/64.1 |
| 3,230,002 A | * | 1/1966 | Olson ..................... 294/64.1 |
| 3,637,249 A | * | 1/1972 | Kuhl et al. ............... 294/64.1 |
| 3,702,698 A | * | 11/1972 | Schwebel ................ 294/64.1 |
| 3,834,558 A | * | 9/1974 | Bru ........................ 414/627 |
| 4,593,947 A | * | 6/1986 | Yocum .................... 294/64.1 |
| 4,707,012 A | * | 11/1987 | Takagi .................... 294/64.1 |
| 4,736,938 A | * | 4/1988 | Jiruse et al. .............. 271/90 |
| 4,763,941 A | * | 8/1988 | Sniderman .............. 294/64.1 |
| 5,169,192 A | * | 12/1992 | Allison et al. ........... 294/64.1 |
| 5,193,776 A | * | 3/1993 | Nagai et al. ............. 294/64.1 |
| 5,572,785 A | * | 11/1996 | Tveit ...................... 294/64.1 |

FOREIGN PATENT DOCUMENTS

| | | | | |
|---|---|---|---|---|
| DE | 003810989 | * | 8/1989 | ........... 294/64.1 |
| DE | 3923672 | * | 5/1990 | |
| JP | 401203193 | * | 8/1989 | ........... 294/64.1 |
| JP | 401240287 | * | 9/1989 | ........... 294/64.1 |
| JP | 403178790 | * | 8/1991 | ........... 294/64.1 |

* cited by examiner

*Primary Examiner*—Saul J. Rodriguez
*Assistant Examiner*—Paul T Chin
(74) *Attorney, Agent, or Firm*—Michael F. Campillo

(57) ABSTRACT

A check valve for pick-and-place applications includes a valve housing with a chamber, and a chamber shuttle with a cavity. The chamber shuttle is accessible from outside the chamber and adapted to receive a suction head. The chamber shuttle is adapted to travel within the chamber and establish "valve-open" and "valve-closed" states based upon the contact of the suction head upon the work piece surface. Blow off of the work piece surface is allowed by a fluid flow channel interposed between the suction head and the chamber shuttle cavity.

20 Claims, 5 Drawing Sheets

TWO WAY NON LEAKING FLOW VALVE WITH FULL-OPEN CAPABILITY

This application is a continuation-in-part from earlier filed application Ser. No. 09/966,862 filed Sep. 28, 2001 now U.S. Pat. No. 6,517,050.

FIELD OF THE INVENTION

The present invention is characterized as a fluid flow valve and is particularly useful in the field of vacuum pressure components used with generated vacuum pressure in pick and place applications.

BACKGROUND OF THE INVENTION

Vacuum valves are useful for manipulating a work piece in pick and place applications. An external pressure source is applied to the valve which typically has a suction head attached, the suction head is contacted to the work piece, which is then lifted depending on the porting of vacuum pressure through the valve. Alternate valve designs have evolved to increase the efficiency of the use of vacuum pressure. Two designs include dual flow and tri-flow type valve designs.

Dual flow valves are generally limited to a small fluid flow through an orifice and are preferred in applications when suction heads many not be in sealing contact with the work piece. Because of the small fluid flow rate, dual flow valves will limit vacuum pressure loss to the orifice flow when sealing contact is not met with the work piece. However, the small fluid flow rate limits dual flow valves to applications involving non-porous work pieces.

Try-flow valves are not limited to a small fluid flow orifice flow rate and therefore offer greater utility at the expense of greater complexity. Tri-flow valves generally have a full-open vacuum state that permits the application of the full vacuum potential applied to a valve. Moreover, the inclusion of a flow sensor enables the tri-flow valve to determine when a suction head has not made sealing contact with the work piece and decrease the leakage of the tri-flow valve to the orifice flow rate.

With either of the above discussed dual-flow or tri-flow valve, there is always an inherent leakage if a non-sealing contact is made with the work piece. It would be desirable to eliminate or minimize the orifice flow rate leakage in pick and place applications to conserve vacuum pressure and the energy required to create vacuum pressure. This inherent undesirable characteristic of the above valve designs is further aggravated when an array of dual-flow and/or tri-flow valves are working in parallel off the same vacuum generator.

A further undesirable characteristic of the above valves designs is the necessity to have visual confirmation of contact of the suction head to the work piece prior to turning on the vacuum pressure. In other words, vacuum pressure is ordinarily not applied in a system including the above valve types until there is contact between the suction head and the work piece. It would instead be desirable to enable the valve with the functionality to determine the proper instant to apply vacuum pressure. Such functionality would further enable the saving of vacuum pressure in a pick and place application.

SUMMARY OF THE INVENTION

The present invention is summarized as a two way check-valve. The valve comprises a chamber having, a first chamber opening, a second chamber opening, and a first chamber portion and a second chamber portion delineated by a chamber edge, the first chamber opening adapted to receive a fluid pressure source such as negative pressure.

The valve further includes a chamber shuttle comprising, a chamber shuttle cavity having a chamber shuttle cavity wall, the chamber shuttle cavity wall protruding through the second chamber opening and having at least a first cavity wall portion alongside the second chamber portion forming an fluid flow deterrent therewith, and a second cavity wall portion with an aperture therein, the second cavity wall portion movable between the second chamber portion, forming an fluid flow deterrent therewith, and the first chamber portion forming a fluid flow channel between the chamber and the chamber shuttle cavity through the aperture. A force applied between the chamber and the chamber shuttle biases the second cavity wall portion into the first chamber portion. The optional ability to apply positive pressure at the work piece surface from the suction head to quickly release the work piece is implemented in two optional structures.

In pick-and-place applications, a suction head is connected to the chamber shuttle cavity wall and negative pressure is applied to the fluid flow opening. To pick up a work piece, the suction head is applied to the surface with sufficient force to overcome the biasing force thereby allowing fluid flow between the fluid flow opening and the aperture in the second cavity wall portion. Fluid flow through the shuttle cavity will eliminate the pressure differential between the fluid flow opening and the shuttle cavity and enable the development of negative pressure in the cavity existing between the suction head and the work piece surface. The force applied by the negative pressure operating against the work piece surface is greater than the biasing force and maintains the valve-open state. If however the work piece is removed, or if the work piece surface is sufficiently porous, the force applied by the negative pressure is insufficient to overcome the biasing force, which will therefore force the shuttle cavity into the valve-closed state.

A first objective of the invention is to provide a two way valve with very small leakage and full blow-off capability.

A second objective of the invention is to provide a economically feasible valve construction incorporating aspects of the invention.

DETAILED DESCRIPTIONS OF EMBODIMENTS

Figure 1A:
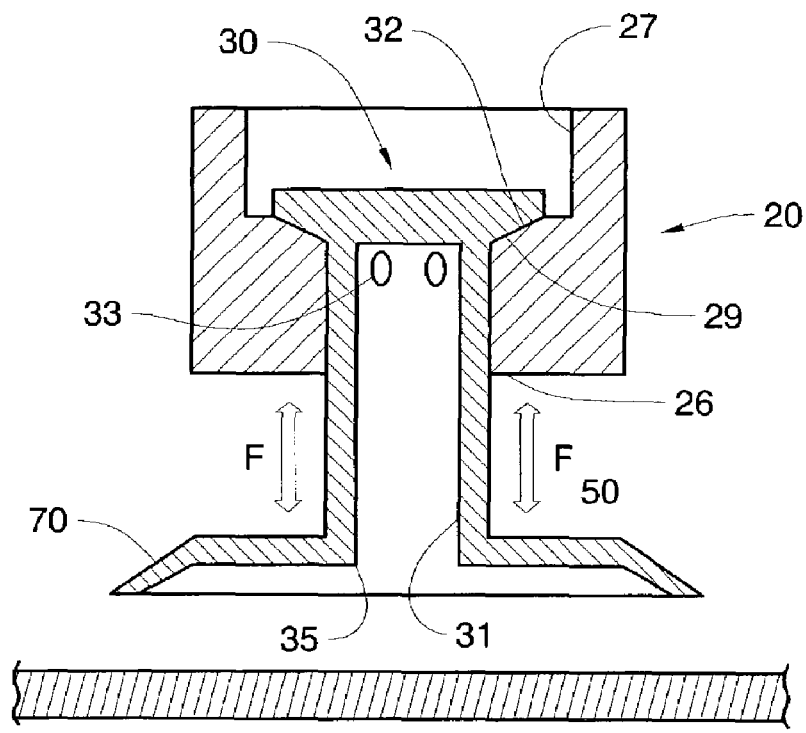
FIG. 1A illustrates a cut-away of a first embodiment of the valve closed to fluid-flow.
Figure 1B:
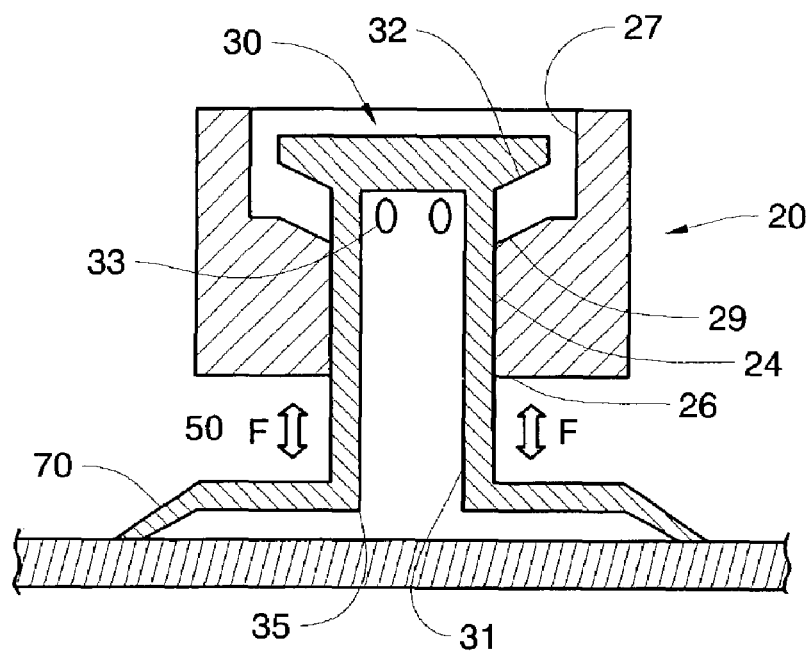
FIG. 1B illustrates the cut-away of the first embodiment of the valve open to fluid flow.

A first embodiment of the invention is depicted in FIGS. 1a & 1b. The first valve embodiment comprises a housing 20 that has a valve chamber bounded by a valve chamber wall 24 and having a first valve chamber opening bounded by a first valve chamber opening edge 26 and a fluid flow opening bounded by a fluid flow opening edge 27. Fluid pressure is applicable at the fluid flow opening edge 27. A chamber shuttle 30, having a chamber shuttle cavity bounded by a chamber shuttle cavity wall 31 and having at least a first chamber shuttle cavity aperture 33 and a chamber shuttle cavity opening bounded by a second chamber shuttle cavity opening edge 35, is adapted to travel within the valve chamber.

A first portion of the chamber shuttle cavity wall 31 outer surface travels substantially adjacent a first portion of the valve chamber wall 24 establishing a fluid flow deterrent and ideally a substantially air-sealing junction therewith. In the "valve closed" state, a second portion 29 of the valve chamber wall 24 contacts a second portion 32 of the chamber shuttle cavity wall 31 outer surface establishing a fluid flow deterrent and ideally a substantially air-sealing junction therewith. See FIG. 1a. In the "valve open" state, the second portion 29 of the valve chamber wall 24 does not contact a second portion 32 of the chamber shuttle cavity wall 31 outer surface allowing fluid flow between the fluid flow opening and the chamber shuttle cavity opening aperture 33. See FIG. 1b. The chamber shuttle 30 is biased by a force 50 applied from a position fixed relative to the valve housing 20 to establish a default valve-closed state. However, the chamber shuttle 30 is movable against the biasing force 50 to establish the valve-open state.

The preferred valve chamber and chamber shuttle 30 shapes are substantially tubular shaped. In particular, the preferred valve chamber and chamber shuttle 30 shapes are cylindrical. A suction head 70 is connectable to the chamber shuttle cavity wall 31 for pick and place applications. The force 50 is preferably applied by a spring 52 biased between a suction head 70 surface and the housing 20.

Figure 2A:
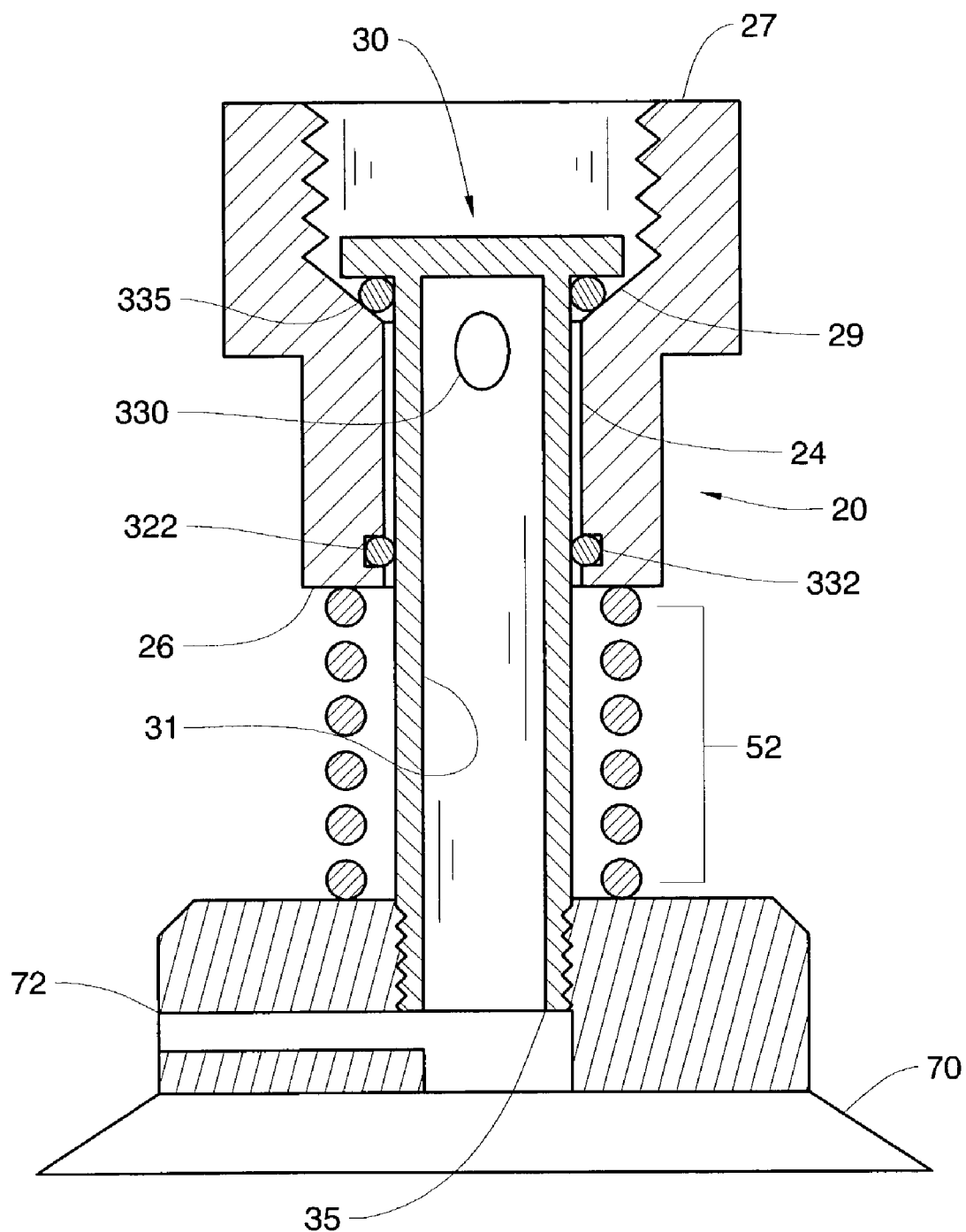
FIG. 2A illustrates a valve construction embodiment closed to fluid-flow, and incorporating a first implementation of optional blow-off capability structure and components.
Figure 2B:
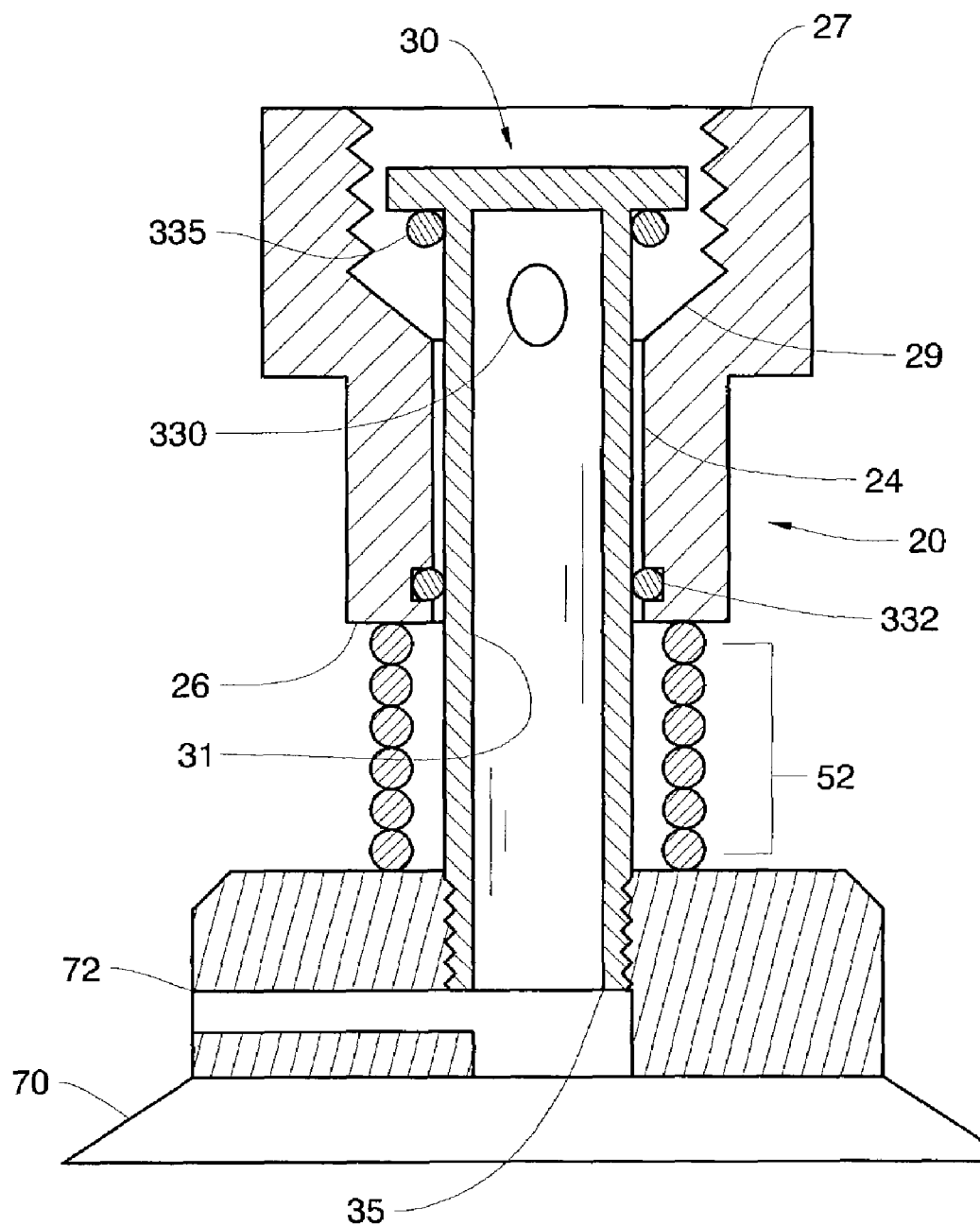
FIG. 2B illustrates the valve construction open to fluid-flow.

The second preferred embodiment of the present invention is a valve construction illustrated in FIGS. 2a & 2b. A housing 20 for the valve components is characterized by a valve chamber bounded by a valve chamber wall 24. The preferred valve chamber is cylindrical although other shapes, such as square or rectangular tubular, could also be used. Moreover, the valve chamber has a first portion having a larger diameter and delineated from a second portion by a valve chamber wall portion delineation edge 29. The valve chamber wall 24 further has a first valve chamber opening bounded by a valve chamber edge 26 and a fluid flow opening bounded by a fluid flow opening edge 27. It is desirable to provide threading on a fluid flow opening inner or outer surface to enable connection with a negative pressure source.

A chamber shuttle 30 having a chamber shuttle cavity is bounded by a chamber shuttle cavity wall 31. The preferred chamber shuttle cavity shape and bounding shuttle cavity wall 31 are also cylindrically shaped and fit within the cylindrically shaped valve chamber and against the valve chamber wall 24. Alternative valve chamber shapes are also possible and square or rectangular tubular chamber shuttle cavity shapes are also contemplated to be equivalents provided that the shuttle cavity wall 31 outer surface can form a fluid flow deterrent and ideally an air sealing junction with the valve chamber wall 24. Preferably, at least one O-ring 332 is included between the outer surface of the chamber shuttle cavity wall 31 and the valve chamber wall 24 to augment the effectiveness of the a fluid flow deterrent between the valve chamber wall 24 and the outer surface of the chamber shuttle cavity wall 31.

The biasing force 50 of the second embodiment preferably comprises a spring 52 biased between the valve housing 20 and a position fixed relative to the shuttle valve. Ordinarily, the preferred biasing surfaces for the spring 52 comprise the suction head 70 coupled to the chamber shuttle cavity wall 31 and the valve chamber edge 26.

A first portion of the chamber shuttle cavity wall 31 outer surface travels longitudinally along the valve chamber wall 24, maintaining a fluid flow deterrent and ideally fluid sealing junction between, the valve chamber wall portion delineation edge 29 and the valve chamber edge 26 regardless of the valve state. A second portion of the chamber shuttle cavity wall 31 in which the shuttle cavity aperture 330 exists, is capable of being extended beyond the delineation edge 29 into the first portion of the valve chamber with the larger diameter. When the second portion of shuttle cavity wall 31 is extended beyond the delineation edge 29, it is not subject to fluid flow deterrent with the valve chamber wall 24 and enables fluid flow into the shuttle cavity through the shuttle cavity aperture 330.

To establish a valve open state, the biasing force 50 is overcome by the application of the suction head 70 against a work piece surface causing the chamber shuttle to move relative to the valve housing 20 and extend the second portion of shuttle cavity wall 31 beyond the delineation edge 29 exposing the shuttle cavity aperture 330 to negative pressure applied at the fluid flow opening. Pressure within the open valve equalizes and the cavity between the suction head 70 and the work piece surface develops negative pressure holding the work piece surface in place. The force applied by the negative pressure in the suction head 70 operating against the work piece surface is sufficient to overcome the biasing force 50 and maintain the valve open state. If however, the junction of the suction head 70 and the work piece surface do not create an air sealing surface, or if the work piece surface is too porous, the force applied by the negative pressure in the suction head 70 operating against the work piece surface is insufficient to overcome the biasing force 50. The shuttle cavity aperture 330 will force to a non-exposed state thereby disabling fluid flow through the valve and causing a valve closed state.

The O-Ring 332 is attachable to the valve chamber wall 24 by milling a receiving well within the valve chamber wall 24 and seating the O-ring therein. A second O-ring 335 is attachable to the shuttle cavity wall 31 outer surface to facilitate the fluid flow deterrent between the second portion 29 of the shuttle cavity wall 31 outer surface and the second portion 29 of the valve chamber wall 24.

During pick-and-place applications, blow off of the work piece may be done by interposing a fluid flow channel 72 between the shuttle cavity wall 31 and the suction head 70. See FIGS. 2A & 2B. Otherwise, release of the work piece may be accomplished by venting the negative pressure in the suction head 70 through the fluid flow opening and allowing the spring 52 to force the chamber shuttle into a valve closed state.

Figure 3A:
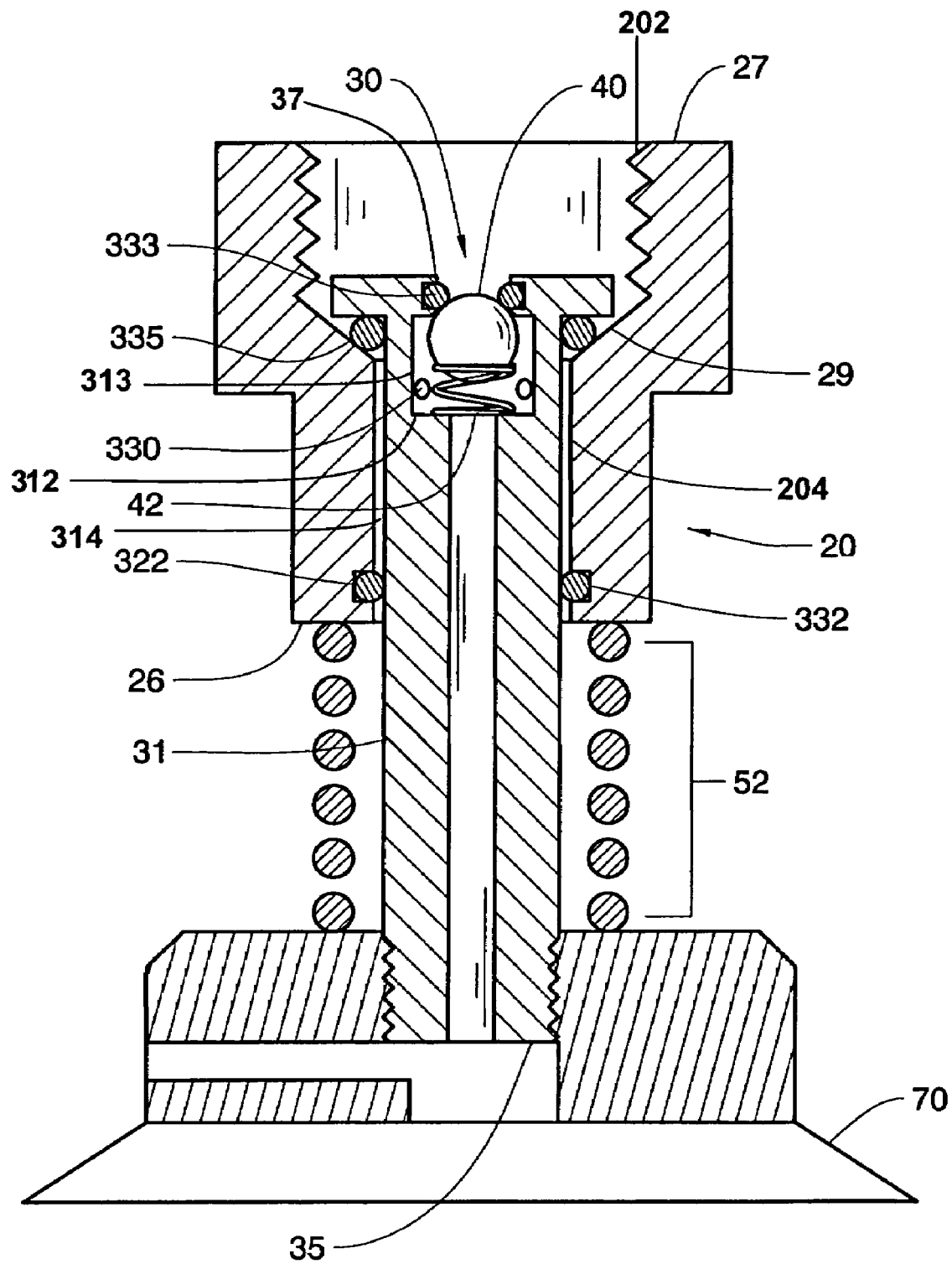
FIG. 3A illustrates the valve construction closed to fluid-flow, and incorporating a second implementation of optional blow-off capability structure and components.
Figure 3B:
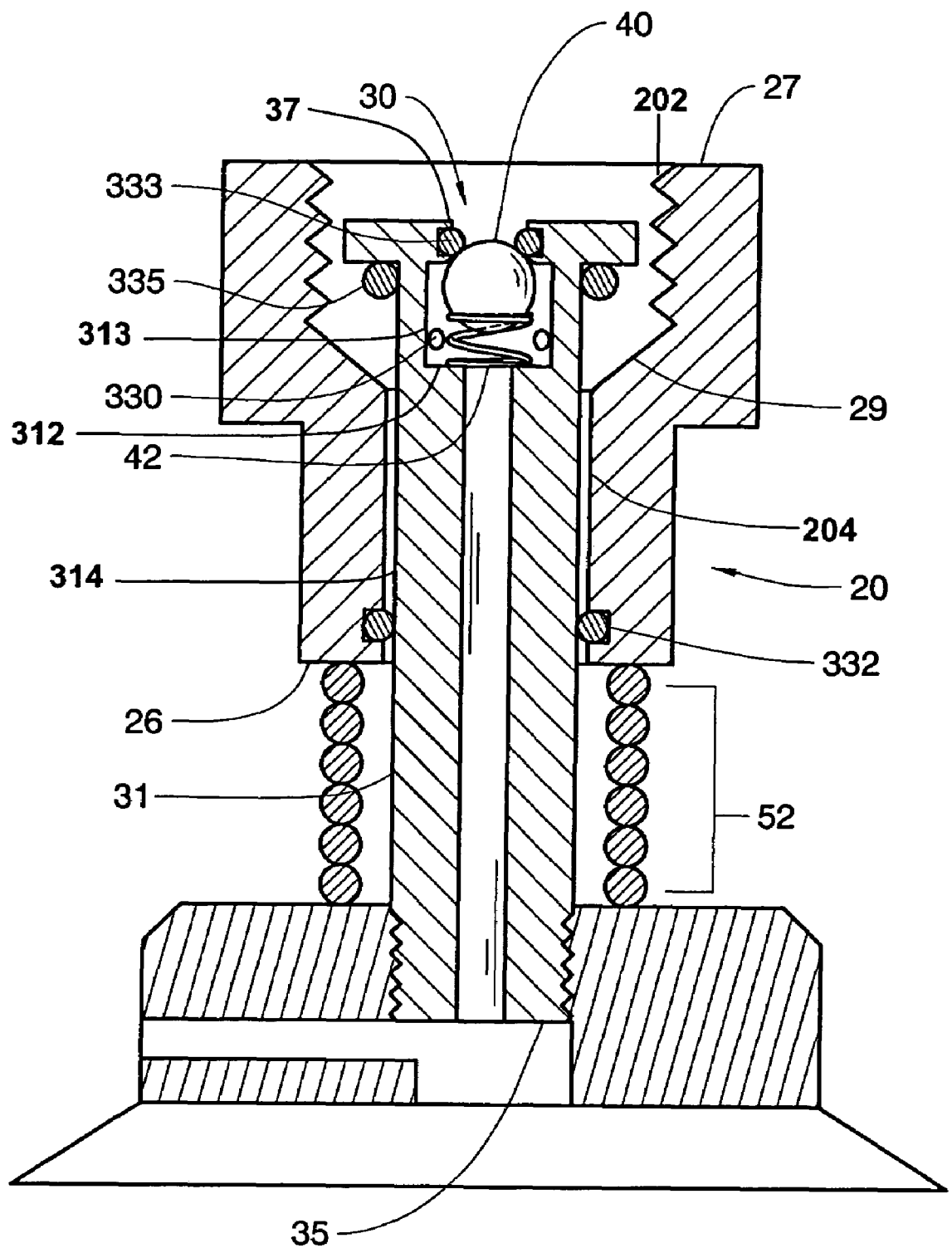
FIG. 3B illustrates the valve construction open to fluid-flow, and incorporating the second implementation of optional blow-off capability structure and components.

Another method and structure for accomplishing a blow off of the work piece is illustrated in FIGS. 3A & 3B. The valve comprises a chamber 20 with a first wall portion 202 separated from a second wall portion 204 by a delineation 29, and a first opening edge 27 terminating the first wall portion 202 and a second opening edge 26 terminating the second wall portion 204. The shuffle cavity 30 has a first shuttle cavity opening edge 35 and a second shuttle cavity opening edge 37 at the end of the shuffle cavity 30 opposite the first shuttle cavity opening edge 35. The shuffle also comprises a second cavity wall portion 313 having a first aperture 330 and terminated by the second shuffle cavity opening edge 37 and a first cavity wall portion 314 terminated by the first shuttle cavity opening edge 35 and accessible at the second opening edge 26 of the chamber 20. A plug 40 is biased, preferably by a spring 42, against the shuffle cavity wall 31 to deter fluid flow between the shuffle cavity and the chamber when negative pressure is introduced into the chamber 20 at the first opening edge 27. A shuffle cavity wall edge 312 is preferably incorporated into the shuffle cavity wall 31 providing a surface against which the spring 42 may be biased. An o-ring 333 is attachable to the second shuffle cavity opening edge 37 to aid in the deterrence of fluid flow between the shuffle cavity and the chamber and ideally create an air-sealing surface between the plug 40 surface and the o-ring 333. During vacuum operation, negative pressure is introduced at the first opening edge 27. If the junction of the suction head 70 and the work piece surface do not create an air sealing surface, or if the work piece surface is too porous, the force applied by the negative pressure in the suction head 70 operating against the work piece surface is insufficient to overcome the biasing force of the spring 52. The shuffle cavity aperture 330 will force to a non-exposed state thereby disabling fluid flow through the valve and causing a valve closed state. During a blow off operation, positive air pressure is introduced into the first wall portion 202 of the chamber 20 which impinges upon and separates the plug 40 surface and o-ring 333 thereby permitting positive air pressure to flow through the shuffle cavity and impinge upon and cause a release the work piece surface.

Although the invention has been described in detail with reference to particular preferred embodiments, persons possessing ordinary skill in the art to which this invention pertains will appreciate that various modifications and enhancements may be made without departing from the spirit and scope of the claims that follow.

What is claimed is:

1. A valve, comprising:
a chamber having a first opening edge and a second opening edge, the chamber having a delineation between a first wall portion and a second wall portion; and
a chamber shuttle comprising a chamber shuttle cavity having a chamber shuttle cavity wall and a first shuffle cavity wall opening edge, the chamber shuttle cavity wall having at least a first cavity wall portion alongside the second wall portion forming a fluid flow deterrent therewith, and a second cavity wall portion with a first aperture, the second cavity wall portion movable adjacent to the second wall portion, forming a fluid flow deterrent therewith, and away from the second wall portion forming a fluid flow channel between the chamber and the chamber shuttle cavity through the first aperture, the second cavity wall portion having a second shuffle cavity wall opening edge; and
a plug positionable apart from the second shuttle cavity wall opening edge forming a fluid flow channel between the chamber and the chamber shuttle cavity, if the second cavity wall portion is adjacent the second wall portion.

2. The valve in claim 1 further comprising,
a force applied between the chamber and the chamber shuttle to bias the second cavity wall portion adjacent to the second wall portion; and
a suction head coupled to the shuttle cavity wall, wherein forceful contact between the suction head and a work piece surface opposes and overcomes the force applied between the chamber and the chamber shuttle and moves the second cavity wall portion away from the second wall portion.

3. The valve in claim 2 wherein,
the force applied between the chamber and the chamber shuttle is applied by a spring adjacent the chamber shuttle cavity wall and biased between the suction head and the second wall portion.

4. The valve in claim 1 wherein,
a positive air pressure applied to the first opening edge separates the plug from the second shuttle cavity wall opening edge.

5. The valve in claim 1 wherein,
the plug is biased against the second shuttle cavity wall opening edge by a force to stop fluid flow and is separated from the second shuttle cavity wall opening edge by an opposing force to permit fluid flow.

6. The valve in claim 5 wherein,
a spring is positioned against a portion of the second cavity wall portion opposite the second shuttle cavity wall opening edge to bias the plug against the second shuttle cavity wall opening edge.

7. The valve in claim 1 wherein,
the chamber and the chamber shuttle cavity are substantially cylindrically shaped and the first wall portion has a larger diameter than the second wall portion.

8. The valve in claim 7 wherein,
the fluid flow deterrent formed between the first cavity wall portion alongside the second wall portion is augmented by an O-ring positioned within a well in the second wall portion.

9. The valve in claim 7 wherein,
the fluid flow deterrent formed between the second cavity wall portion and the second wall portion is augmented by an O-Ring positioned circumferentially around the chamber shuttle cavity wall.

10. A valve construction, comprising:m
a chamber having, a first wall portion delineated from a second wall portion by a chamber edge, and a first opening edge and a second opening edge;
a tubular chamber shuttle comprising a tubular cavity wall having,
a first distal end comprising a blow-off port and having a positive edge positionable adjacent the chamber edge forming a fluid flow deterrent therewith in a valve closed state, and positionable apart from the chamber edge in a valve open state,
a middle portion with a first aperture therein and at least partially positionable, alongside the second wall portion forming a fluid flow deterrent therewith in a valve closed state, and away from the second wall portion in a valve open state forming a fluid flow channel between the chamber and the chamber shuttle cavity through the aperture; and
a plug that is seated against the blow-off port in both valve closed and valve open states but separable from the blow-off port in a valve blow-off state.

11. The valve construction in claim 10 wherein,
the tubular chamber shuttle further comprises a second distal end having an opening edge that protrudes through the second opening edge of the chamber, and
a spring, biased between the chamber and a position fixed relative to the tubular chamber shuttle.

12. The valve construction in claim 11 wherein,
a suction head is connected to the second distal end of the chamber shuttle and the spring is biased between the chamber and a surface on the suction head.

13. The valve construction in claim 12 wherein,
a fluid flow channel is interposed between the second distal end and the suction head.

14. The valve construction in claim 10 wherein,
the fluid flow deterrent formed between the shuttle cavity wall middle portion and the second wall portion is augmented by an o-ring interposed there between.

15. The valve construction in claim 14 wherein,
the second wall portion has a receiving well for the o-ring.

16. The valve construction in claim 10 wherein,
the fluid flow deterrent formed by the positive edge positionable adjacent the chamber edge forming a fluid flow deterrent therewith is augmented by an o-ring interposed there between.

17. The valve construction in claim 10 wherein,
the first distal end has opening edge there in and the plug biased against a tubular cavity wall edge to contact the opening edge and form an air deterrent junction therewith.

18. The valve construction in claim 17 further comprising,
an o-ring is attached to the opening edge to augment the air deterrent junction with the plug.

19. A method of operating a valve, the valve comprising a chamber having a delineation between a first chamber opening and a second chamber opening, the first chamber opening adapted to receive fluid pressure; a chamber shuttle comprising, a chamber shuttle cavity having a chamber shuttle cavity wall, the chamber shuttle cavity wall having at least a first cavity wall portion alongside the second chamber portion forming a fluid flow deterrent therewith, and a second cavity wall portion with an aperture therein, the second cavity wall portion movable between the second chamber portion, forming a fluid flow deterrent therewith, and the first chamber portion forming a fluid flow channel between the chamber and the chamber shuttle cavity through the aperture; the chamber shuttle further comprising a pressure port having a plug that is biased against the pressure port and a force applied between the chamber and the chamber shuttle to bias the second cavity wall portion into the second chamber portion; the method comprising:
 applying negative pressure to the first chamber opening;
 position a suction head coupled to the chamber shuttle cavity wall adjacent to a work piece;
 contacting the suction head to the work piece to overcome the force applied between the chamber and the chamber shuttle thereby,
 moving the second cavity wall portion with the aperture therein into the first chamber portion to permit fluid-flow between the first chamber opening and the chamber shuttle cavity wall.

20. The method of claim 19 further comprising:
 applying positive pressure to the first chamber opening to separate the plug from the pressure port.

\* \* \* \* \*